United States Patent [19]

Wu

[11] Patent Number: 5,382,461

[45] Date of Patent: Jan. 17, 1995

[54] EXTRUSION LAMINATE OF INCREMENTALLY STRETCHED NONWOVEN FIBROUS WEB AND THERMOPLASTIC FILM AND METHOD

[75] Inventor: Pai-Chuan Wu, Cincinnati, Ohio

[73] Assignee: Clopay Plastic Products Company, Inc., Cincinnati, Ohio

[21] Appl. No.: 32,355

[22] Filed: Mar. 12, 1993

[51] Int. Cl.⁶ .......................... B32B 3/26; B32B 5/02; B32B 31/30

[52] U.S. Cl. ...................... 428/86; 156/160; 156/196; 156/229; 156/244.27; 428/290; 428/296; 428/334; 428/335; 428/336; 428/340

[58] Field of Search .......... 156/160, 196, 229, 244.27; 428/86, 290, 334, 335, 336, 340

[56] References Cited

U.S. PATENT DOCUMENTS

| | | |
|---|---|---|
| 2,714,571 | 8/1955 | Irion et al. |
| 3,058,868 | 10/1962 | Palatine, III .................... 156/153 |
| 3,591,444 | 7/1971 | Hoppl .............................. 428/86 |
| 3,622,422 | 11/1971 | Newmann ........................ 156/306 |
| 4,153,664 | 5/1979 | Sabee ............................... 264/289 |
| 4,242,406 | 12/1980 | Bouhnini et al. ................ 428/236 |
| 4,379,197 | 4/1983 | Cipriani et al. ................. 428/220 |
| 4,517,714 | 5/1985 | Sneed et al. ....................... 28/103 |
| 4,522,203 | 6/1985 | Mays ................................ 128/132 |
| 4,614,679 | 9/1986 | Farrington, Jr. ................ 428/138 |
| 4,692,368 | 9/1987 | Taylor et al. .................... 428/137 |
| 4,725,473 | 2/1988 | Van Gompel et al. .......... 428/156 |
| 4,753,837 | 6/1988 | Hanusa ............................... 428/86 |
| 4,753,840 | 6/1988 | Van Gompel .................... 428/171 |
| 4,911,970 | 3/1990 | Rodenbechs ....................... 428/86 |
| 5,035,941 | 7/1991 | Blackburn ........................ 428/286 |

Primary Examiner—James C. Cannon
Attorney, Agent, or Firm—Wood, Herron & Evans

[57] ABSTRACT

Extrusion laminates of incrementally stretched nonwoven fibrous webs and thermoplastic films are made. A web of spun bonded fibers is incrementally stretched to provide fiber ends extending outwardly from both web surfaces for bonding with the extruded thermoplastic film and to provide a soft fibrous texture to the laminate.

16 Claims, 1 Drawing Sheet

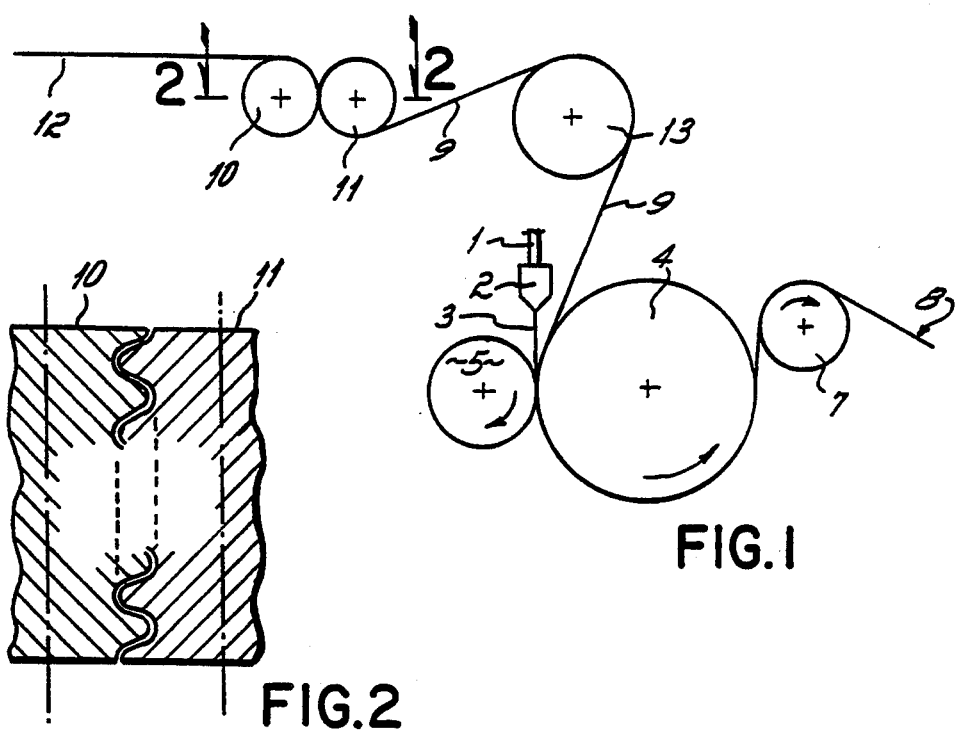
FIG.1
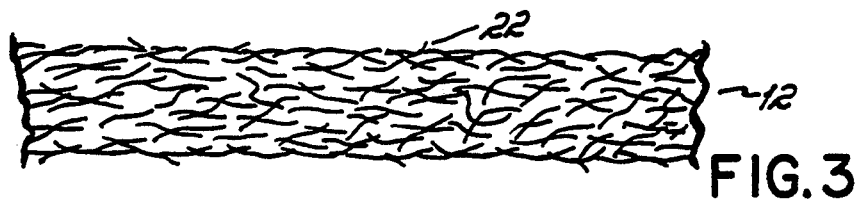
FIG.2
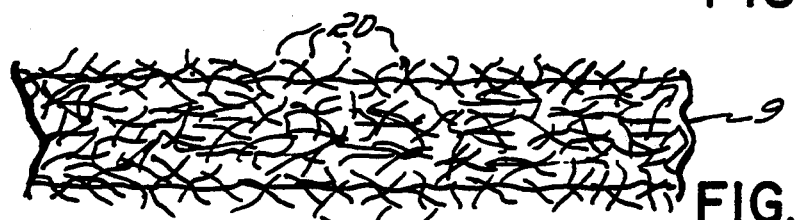
FIG.3
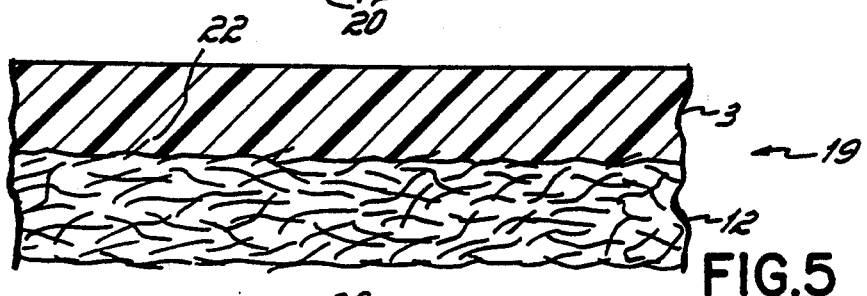
FIG.4
FIG.5
FIG.6

EXTRUSION LAMINATE OF INCREMENTALLY STRETCHED NONWOVEN FIBROUS WEB AND THERMOPLASTIC FILM AND METHOD

BACKGROUND OF THE INVENTION

Processes of bonding nonwoven fibrous webs to thermoplastic films have been known for some time. Additionally, methods for extrusion laminating thermoplastic films to unstretched nonwoven webs are well known in the art.

Relevant patents regarding extrusion lamination of unstretched nonwoven webs include U.S. Pat. Nos. 2,714,571; 3,058,863; 4,522,203; 4,614,679; 4,692,368; 4,753,840 and 5,035,941. The above '863 and '368 patents disclose stretching extruded polymeric films prior to laminating with unstretched nonwoven fibrous webs at pressure roller nips. The '203 and '941 patents are directed to co-extruding multiple polymeric films with unstretched nonwoven webs at pressure roller nips. The '840 patent discloses preforming nonwoven polymeric fiber materials prior to extrusion laminating with films to improve bonding between the nonwoven fibers and films. More specifically, the '840 patent discloses conventional embossing techniques to form densified and undensified areas in nonwoven base plies prior to extrusion lamination to improve bonding between nonwoven fibrous webs and films by means of the densified fiber areas. The '941 patent also teaches that unstretched nonwoven webs that are extrusion laminated to single ply polymeric films are susceptible to pinholes caused by fibers extending generally vertically from the plane of the fiber substrate and, accordingly, this patent discloses using multiple coextruded film plies to prevent pinhole problems. Furthermore, methods for bonding loose nonwoven fibers to polymeric film are disclosed in U.S. Pat. Nos. 3,622,422; 4,379,192 and 4,725,473.

It has also been known to stretch nonwoven fibrous webs using intermeshing rollers to reduce basis weight and examples of patents in this area are U.S. Pat. Nos. 4,153,664 and 4,517,714. The '664 patent discloses a method of incremental cross direction (CD) or machine direction (MD) stretching nonwoven fibrous webs using a pair of interdigitating rollers to strengthen and soften nonwoven webs. The '664 patent also discloses an alternative embodiment wherein the nonwoven fibrous web is laminated to the thermoplastic film prior to intermesh stretching.

There is a continuing need to achieve satisfactory bond strengths between nonwoven fibrous substrates and plastic films while providing sufficient absorbency or softness by the fibrous web. It would be very desirable to provide a high speed method of bonding a nonwoven fibrous web to a thermoplastic film thereby producing a laminate having a soft absorbent layer and sufficient bond strength without pinholes in the film. Improvements are also needed in order to overcome the problems associated with presently available process technology.

SUMMARY OF THE INVENTION

This invention is directed to an extrusion laminate of a stretched nonwoven fibrous web and a thermoplastic film. The laminate has improved bond strengths between the fibrous web and the extruded film and a soft fibrous texture. It is also an objective of this invention to provide such a laminate without pinholes in the thermoplastic film that is produced on high speed production machinery at line speeds of about 500 to 1000 fpm.

The extrusion laminate comprises a nonwoven fibrous web having a multitude of fiber ends extending outwardly from both web surfaces formed by incremental stretching of the fibrous web along lines substantially uniformly across the web and throughout its depth. A thermoplastic film is extrusion laminated to one surface of the fibrous web with the fiber ends extending into the film for bonding the web to the film without penetrating through the film, and the fiber ends extending from the other film surface provides a soft fibrous texture to the laminate.

In a most preferred form, the method of this invention involves inline stretching and lamination, more specifically, the method comprises incrementally stretching a nonwoven fibrous web prior to extrusion lamination with a thermoplastic film. The fibrous web is first incrementally stretched along lines substantially uniformly across the web and throughout its depth to provide a multitude of fiber ends extending outwardly from both web surfaces. Then, the incrementally stretched fibrous web is introduced into a roller nip and the thermoplastic film is extruded onto one web surface in the nip for bonding the web to the film. The compressive force is controlled at the nip for bonding one surface of the fibrous web with fiber ends extending into said film without penetrating through the film. The other web surface having extending fiber ends is maintained to provide a soft fibrous texture to the laminate.

Other benefits, advantages and objectives of this invention will be further understood with reference to the following detailed description.

DETAILED DESCRIPTION OF THE INVENTION

It is a primary objective of this invention to produce a laminate of a thermoplastic film and a nonwoven fibrous web on high speed production machinery to produce satisfactory bond strengths of the film to one web surface with maintenance of a soft fuzzy feel on the other surface of the laminate. As developed above, these and other objectives are achieved in a preferred form of the invention by first incrementally stretching the nonwoven fibrous web along lines substantially uniformly across the web and throughout its depth to provide a multitude of fiber ends extending outwardly from the web. It has been found, by first incrementally stretching the fibrous web, unexpected bond strengths of the web with the thermoplastic film result upon extrusion lamination. Furthermore, it has been found that such a laminated composite may be made by extrusion without forming pinholes in the thermoplastic film. Accordingly, the extrusion laminated composite is characterized by being impervious to the passage of liquid by virtue of the thermoplastic film while maintaining a soft feel on the fibrous web surface of the laminate. Thus, the laminated composite has utility in a number of applications including surgical gowns, sheets, dressings, hygenic products and the like.

A. Materials For The Laminate

The thermoplastic film preferably is of the polyolefin type and may be any of the class of thermoplastic polyolefin polymers that are processible into a film for direct lamination by melt extrusion onto the fibrous web. Suitable thermoplastic polymers may be biodegradable or environmentally degradable. A number of biodegradable thermoplastic polymers suitable in the practice of the invention are of the normally-solid oxyalkanoyl polymers or dialkanoyl polymers represented by poly(caprolactone) or poly(ethylene adipate); polysaccharides or modified polysaccharides such as starch-resin compositions that may be film-formed. Suitable thermoplastic polymers that may also be environmentally degradable include polyolefin based polymers that may be film-formed into water insoluble and impermeable films for use as barrier materials in the manufacture of many useful articles such as diapers, underpads, packaging, drapes and the like. The olefin based polymers include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins. The olefins thus that may be polymerized alone or in admixture with other ethylenically unsaturated monomers include, e.g., ethylene; propylene; 1-butene; isobutene; 1-pentene; halogenated olefins such as chloroprene; vinyl benzenes and naphthalenes such as styrene or vinyl naphthalene; vinyl or vinylidene halides such as vinyl chloride and vinylidene chloride; vinyl esters such as vinyl acetate and vinyl benzoate; acrylic and methacrylic acids (otherwise known as polyacrylate of methacrylate) and esters or amides thereof; and dienes such as butadiene, isoprene and cyclopentadiene. Other examples of polymers suitable for use as films in the composite sheet of this invention are known with reference to the above identified patents cited in the background of this invention and these are incorporated herein by reference.

The nonwoven fibrous web may comprise fibers of polyethylene, polypropylene, polyesters, rayon, cellulose, nylon, and blends of such fibers. A number of definitions have been proposed for nonwoven fibrous webs. The fibers are usually staple fibers or continuous filaments. As used herein "nonwoven fibrous web" is used in its generic sense to define a generally planar structure that is relatively flat, flexible and porous, and is composed of staple fibers or continuous filaments. For a detailed description of nonwovens, see "Nonwoven Fabric Primer and Reference Sampler" by E. A. Vaughn, Association of the Nonwoven Fabrics Industry, 3d Edition (1992).

B. Stretchers For the Fibrous Webs

A number of different stretchers and techniques may be employed to stretch the starting or original nonwoven fibrous web. Nonwoven carded fibrous webs of staple fibers or nonwoven spun-bonded fibrous webs may be stretched with the stretchers and techniques described as follows:

1. Diagonal Intermeshing Stretcher

The diagonal intermeshing stretcher consists of a pair of left hand and right hand helical gear-like elements on parallel shafts. The shafts are disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

Air cylinders are employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all the machine nip points when activated.

A drive means is typically utilized to drive the stationery intermeshing roll. If the upper intermeshing roll is to be disengageable for purposes of machine threading or safety, it is preferable to use an antibacklash gearing arrangement between the upper and lower intermeshing rolls to assure that upon reengagement the teeth of one intermeshing roll always fall between the teeth of the other intermeshing roll and potentially damaging physical contact between addendums of intermeshing teeth is avoided. If the intermeshing rolls are to remain in constant engagement, the upper intermeshing roll typically need not be driven. Drive may be accomplished by the driven intermeshing roll through the material being stretched.

The intermeshing rolls closely resemble fine pitch helical gears. In the preferred embodiment, the rolls have 5.935" diameter, 45° helix angle, a 0.100" normal pitch, 30 diametral pitch, 14 ½° pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation.

2. Cross Direction Intermeshing Stretcher

The CD intermeshing stretching equipment is identical to the diagonal intermeshing stretcher with differences in the design of the intermeshing rolls and other minor areas noted below. Since the CD intermeshing elements are capable of large engagement depths, it is important that the equipment incorporate a means of causing the shafts of the two intermeshing rolls to remain parallel when the top shaft is raising or lowering. This is necessary to assure that the teeth of one intermeshing roll always fall between the teeth of the other intermeshing roll and potentially damaging physical contact between intermeshing teeth is avoided. This parallel motion is assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

The drive for the CD intermeshing stretcher must operate both upper and lower intermeshing rolls except in the case of intermeshing stretching of materials with a relatively high coefficient of friction. The drive need not be antibacklash, however, because a small amount of machine direction misalignment or drive slippage will cause no problem. The reason for this will become evident with a description of the CD intermeshing elements.

The CD intermeshing elements are machined from solid material but can best be described as an alternating stack of two different diameter disks. In the preferred embodiment, the intermeshing disks would be 6" in diameter, 0.031" thick, and have a full radius on their edge. The spacer disks separating the intermeshing disks would be 5 ½" in diameter and 0.069" in thickness. Two rolls of this configuration would be able to be intermeshed up to 0.231" leaving 0.019" clearance for material on all sides. As with the diagonal intermeshing stretcher, this CD intermeshing element configuration would have a 0.100" pitch.

3. Machine Direction Intermeshing Stretcher

The MD intermeshing stretching equipment is identical to the diagonal intermeshing stretch except for the design of the intermeshing rolls. The MD intermeshing rolls closely resemble fine pitch spur gears. In the preferred embodiment, the rolls have a 5.933" diameter, 0.100" pitch, 30 Diametral pitch, 14 ½° pressure angle, and are basically a long addendum, topped gear. A second pass was taken on these rolls with the gear hob offset 0.010" to provide a narrowed tooth with more clearance. With about 0.090" of engagement, this configuration will have about 0.010" clearance on the sides for material thickness.

4. Incremental Stretching Technique

The above described diagonal, CD or MD intermeshing stretchers may be employed to produce the incrementally stretched nonwoven fibrous web that is used to form the laminate of this invention. The stretching operation is usually employed on a nonwoven fibrous web of staple fibers or spun-bonded filaments. In one of the unique aspects of this invention a nonwoven fibrous web of spun-bonded filaments may be incrementally stretched to provide a very soft fibrous finish to the laminate that looks like carded fibers with superior bond strengths. The woven fibrous web is incrementally stretched using, for instance, the CD intermeshing stretcher with one pass through the stretcher with a depth of roller engagement at about 0.090 inch to 0.120 inch at speeds from about 500 fpm to 1000 fpm or faster. The results of such CD incremental or intermesh stretching produces a multitude of fiber ends extending outwardly from both web surfaces and throughout the web depth to provide the superior bond strengths and soft fibrous texture.

DETAILED EXAMPLES OF THE INVENTION

The following examples illustrate the extrusion laminated composites of this invention and methods of making them. In light of these examples and this further detailed description, it is apparent to a person of ordinary skill in the art that variations thereof may be made without departing from the scope of this invention.

The invention is further understood with reference to the drawings in which:

FIG. 1 is a schematic of an inline intermeshing and extrusion lamination apparatus for making the laminate of this invention.

FIG. 2 is a cross sectional view taken on line 2—2 of FIG. 1 illustrating the intermeshing rollers in diagrammatic form.

FIG. 3 is a magnified diagrammatic sketch in cross-section of a nonwoven fibrous web showing fibers before stretching.

FIG. 4 is a magnified diagrammatic sketch of the fibrous web of FIG. 3 after incremental stretching to provide a multitude of fiber ends extending outwardly from both web surfaces.

FIG. 5 is a magnified diagrammatic sketch of the nonwoven fibrous web of FIG. 3 after lamination to demonstrate low bonding between nonwoven fibers and the plastic film surface.

FIG. 6 is a magnified diagrammatic sketch of the nonwoven fibrous web of FIG. 4 after lamination to demonstrate the superior bonding of the multitude of extending fiber ends formed by incremental stretching and laminating into the plastic film surface.

OPERATING AND COMPARATIVE EXAMPLES 1A and 1B

Extrusion lamination of low density polyethylene (LDPE) film and incrementally stretched polypropylene nonwoven fibrous web was made for direct comparison with an extrusion lamination of unstretched nonwoven polypropylene to LDPE.

A. Extrusion Laminate of Incrementally Stretched Nonwoven Fibrous Web and Thermoplastic Film A carded polypropylene nonwoven fibrous web of 18 grams/yd$^2$ weight was incrementally stretched with the CD stretcher, as described above, prior to extrusion lamination with LDPE thermoplastic film of about 0.52 mil in thickness. This is schematically shown in FIG. 1 where the incoming web 12 was passed through the CD stretcher rollers 10 and 11 at a depth of rolled engagement at about 0.090 inch at about 500–1000 fpm. The intermeshing rollers 10 and 11 are diagrammatically shown in FIG. 2 to illustrate the uniform stretching along lines across the web and through the depth of the web. After stretching, the intermeshed web 9 had a weight of 12 grams/yd$^2$. In cross-section, the starting web 12 is shown diagrammatically in FIG. 3, before stretching and stretched web 9 is shown in FIG. 4. The incrementally stretched web 9 is then continuously fed inline at production machinery speed at about 500–1000 fpm over idle roller 13 into a nip of a rubber roll 5 and a metal roll 4. Alternately, two metal rolls may be used with a fixed gap. The metal roll 4 at the nip may further have an embossing pattern for embossing an extruded plastic film while laminating it to the stretched web 9 at the nip with the rubber roll 5. The LDPE film 3 from extruder 1 was extruded through die 2 into the nip while the incrementally stretched web 9 was introduced. Typically, at speeds over 500 fpm, the polyethylene film 3 on the order of about 0.25 to 8 mils in thickness is laminated at melt temperatures on the order of about 500°–625° F. to form the laminate 8 which is taken off at roller 7. The compressive force at the nip is controlled such that one side of the web is bonded to the polyolefin film without pinholing of the film and preserving the fibrous feel on the fiber surface of the laminate 8. Pressures on the order of about 10 to 80 psi are sufficient to achieve satisfactory bond for fibrous webs of about 5 to 70 grams/yd$^2$. In this example, the web 12 has been stretched to provide a stretched web 9 having about 12 grams/yd$^2$ in weight bonded to the polyethylene film 3 to obtain a laminate having excellent bond strengths as measured by peel force in grams per inch. The peel force was measured using an Instron Tensile Tester and in grams force needed to peel the laminate. The laminate 8 of this invention exhibited "total bond" which means one cannot peel the web 9 from the film 3 without destroying it. Furthermore, the softness of the laminate was measured by using a Handle-O-Meter as measured in grams in the CD direction. This equipment measured the flexibility or "hand" of the fiber side of the web at about 2.2 grams which means it is very flexible and soft. The laminate was also pinhole free.

B. Comparative Example

The unstretched carded polypropylene nonwoven fibrous web 12 of 18 grams/yd² shown in FIG. 3 was extrusion laminated to LDPE thermoplastic film in a manner as described in Example 1A above, except that it was not stretched.

With reference to the above operating Example 1A and comparative Example 1B and FIGS. 3–6, a number of observations are made. First, contrary to the expectation of a reduced bond strength between the stretched web 9 and film 3 of laminate 8, the bond strength substantially exceeded the bond strength of the unstretched nonwoven laminate 19 of FIG. 5. While the unstretched nonwoven fibrous laminate 19 of FIG. 5 produced a bond strength of 60 grams per inch, there was a "total bond" achieved as stated above with the laminate of stretched nonwoven (FIG. 6). With reference to FIGS. 3–4, an examination of the nonwoven web surfaces before and after stretching demonstrated that the incremental stretching provided in web 9 a multitude of extending fiber ends 20 extending outwardly from both nonwoven surfaces. (Diagrammatically demonstrated with reference to FIGS. 3 and 4).

The multiple extending fiber ends 20 formed by incremental stretching account for a superior bond strength after extrusion lamination as demonstrated by the total bond strengths without pinholing. FIGS. 5 and 6 demonstrate diagrammatically the condition of the stretched 8 and unstretched 19 laminates to illustrate the increased bond strengths attributable to the multitude of extending fiber ends into the extruded film of the composite as shown at 21. When actual samples are examined after carefully peeling the nonwoven fiber web from the surface of the thermoplastic film, it was found that many more fibers, perhaps hundreds in several square inches, were actually imbedded into the film at 21 by using the stretched nonwoven web 9 in comparison to the unstretched web 12. Only a small number of fibers 22 extend into the film surface of laminate 19 with the unstretched web 12. Again, this is diagrammatically shown by comparison of FIGS. 5 and 6.

EXAMPLES 2–9

A series of Examples were performed further illustrating the principles of this invention. In this series, a spun bonded polypropylene nonwoven web was stretched and laminated in a manner similar to that described in Example 1. Comparative examples were also run in the same fashion except that the nonwoven web was not stretched. In these Examples, a spun bonded polypropylene nonwoven web with a basis weight of grams/yd² is CD stretched with the apparatus as described above and with reference to FIG. 1 employing a CD roller engagement of 0.115 inches at a speed of 250 fpm. The resultant stretched nonwoven webs are very bulky and have the same characteristic of fiber ends extending outwardly from the web surfaces for bonding with the laminated film. Upon extrusion lamination of the stretched nonwoven web with a polyethylene film (LDPE) at approximately 260 fpm with a film gauge of 0.25 mils as well as 0.5 mls, a laminated product was obtained having the same essential characteristics described above with substantial or total bond strengths. The LDPE film was extruded using a conventional 3½ inch extruder with the barrel setting between 420°–570° F. and die setting between 470°–530° F. where the melt temperature was approximately 540° F. and the screw RPM for the 0.5 and 0.25 mil films were 50 and 25, respectively. These same procedures were employed for other nonwoven webs having a basis weight of 12 grams/yd². Comparative examples for unstretched webs of 12 and grams/yd² were also extrusion laminated. The results of the procedures employing the stretched and unstretched webs upon extrusion lamination are shown in the following Table:

| | EXAMPLES 2–9 | | | | |
|---|---|---|---|---|---|
| | Laminated Products | | Stretched Web | Peel* | ** | *** |
| Example | Film (Mil) | Nonwoven (Grams/yd²) | % Weight Reduction (%) | Bond Strength (Grams/Inch) | Softness (Grams) | Pinholes (Holes/88 in²) |
| 2 | 0.50 | 14 | 0 | 40 | 4.5 | 0 |
| 3 | 0.25 | 14 | 0 | 15 | 4.0 | 0 |
| 4 | 0.50 | 9.2 | 34.3 | TOTAL BOND | 3.0 | 0 |
| 5 | 0.25 | 9.2 | 34.3 | 30 | 2.5 | 0 |
| 6 | 0.50 | 12 | 0 | 30 | 4.0 | 0 |
| 7 | 0.25 | 12 | 0 | 10 | 3.0 | 0 |
| 8 | 0.50 | 8 | 33.3 | TOTAL BOND | 2.0 | 0 |
| 9 | 0.25 | 8 | 33.3 | 25 | 2.0 | 0 |

*Peel force was measured by using an Instron Tensile Tester and measured in grams force needed to peel the laminate.
**Softness was measured by using a Handle-O-Meter in force and measured in grams. This equipment measures the flexibility or hand of a variety of sheet materials. The lower the force measured means the film is more soft and flexible.
***Pinholes are measured by putting an alcohol solution (red) on the film side and detecting the red stain on the other side.

With reference to the Table, Example 4 demonstrates that the inline stretching and extrusion lamination method of this invention for a film of 0.50 mil gauge produces a stretched web of 9.2 grams/yd² and a 34.3% weight reduction. Upon extrusion lamination a total bond is achieved between the web and the extruded film in the laminate. By comparison, the unstretched film of Example 2 had a bond strength of 40 which demonstrates the superior bond strengths achieved by the method of this invention. Furthermore, the softness of the laminate of Example 2 had a value of 4.5 with the unstretched web. In contrast, a value of 3.0 grams was achieved for the laminate of Example 4 of this invention which translates to a substantial improvement in the softness attributable to the fibers extending outwardly from the incrementally stretched fibrous side of the laminate.

Upon comparison of Examples 3 and 5, the bonding strengths and softness improvements of the laminate of this invention are further demonstrated with a 0.25 mil film. In the case of inventive Example 5, the nonwoven web was stretched with a 34.3% weight reduction from 14 to 9.2 grams/yd² and, upon extrusion lamination, a bond strength of 30 was achieved. By comparison, a bond strength of 15 was achieved for the unstretched web laminate of Example 3. This improvement in bond strength for the incrementally stretched web laminate in comparison to the unstretched laminate, by doubling the bond strengths from 15 to 30, is indeed surprising, especially since it was expected that the bond strengths of the stretched fibrous web would be less than the unstretched web laminate. Again, the softness of the unstretched laminate of 2.5 of inventive Example 5 in comparison to 4 for the stretched laminate demonstrates a substantial improvement of softness for the laminate of this invention.

With reference to Examples 6–9, the results are similar to those achieved for Examples 2–5 of Example 5. In other words, for the incrementally stretched nonwoven web in both film thicknesses of 0.25 and 0.5 mil, with a starting nonwoven basis weight of 12 grams/yd$^2$, weight reductions of 33.3% were achieved in both instances. In the case of the 0.5 mil film, a total bond was again achieved by this invention Example 8. In the case of the 0.25 mil film laminate of this invention Example 9, a bond strength value of 25 was achieved in comparison to 10 for the unstretched web of Example 7. Substantial improvements in softness were similarly demonstrated by comparing the values for Examples 6–9 shown in the Table in a fashion similar to those for Examples 2–5.

In addition to the above advantages, as demonstrated by the Table, there were no pinholes formed in the extruded film of this invention in spite of the multitude of hundreds and hundreds of fibers over several square inches extending outwardly from the web surface of the stretched nonwoven web prior to the extrusion lamination process. Therefore, it will be readily understood by a person of ordinary skill in the art that significant advantages are achieved by the inline incremental stretching and extrusion lamination process of this invention. Extrusion laminates are formed having superior bonding strengths and softness characteristics upon comparison with unstretched nonwoven laminates as demonstrated above. Other polyolefin, polyester and other polymeric fibers may be bonded by this method to other thermoplastic films. The above Examples are intended to illustrate these principles, benefits and advantages of this invention and it will be understood that other materials may be employed to achieved the same or similar results.

In view of the above detailed description, it will be understood that variations will occur in employing the principles of this invention depending upon materials and conditions, as will be understood to those of ordinary skill in the art.

What is claimed is:

1. An extrusion laminate of a nonwoven fibrous web and a thermoplastic film comprising
    a nonwoven fibrous web having a multitude of fiber ends extending outwardly from both web surfaces formed by incremental stretching of the fibrous web along lines substantially uniformly across the web and throughout its depth, and
    a thermoplastic film extrusion laminated to one surface of said web with said fiber ends extending into said film for bonding said web to said film without penetrating through said film, the other surface of said web having said fiber ends extending outwardly therefrom to provide a soft fibrous texture to the laminate.

2. The laminate of claim 1 wherein said fibrous web comprises polyolefin fibers.

3. The laminate of claim 1 wherein said thermoplastic film is a polyolefin film.

4. The laminate of claim 1 wherein said fibers are selected from the group consisting of polypropylene, polyethylene, polyesters, cellulose, rayon, nylon and blends two or more of such fibers.

5. The laminate of claim 1 wherein the thermoplastic film is selected from the group consisting of polyethylene, polypropylene and copolymers thereof.

6. The laminate of claim 1 wherein both said web and film are made from biodegradable polymer.

7. The laminate of claim 6 wherein the biodegradable polymer is selected from the group consisting of polyvinyl alcohol, polycapralactone, starch polymers and blends thereof.

8. The laminate of claim 1 wherein the fibrous web has a weight from about 5 to 70 grams/yd$^2$ and the thermoplastic film has a film thickness of about 0.25 to about 8 mils.

9. The laminate of claim 1 wherein said web formed from staple or spun-bonded fibers.

10. A method of inline stretching and extrusion laminating a nonwoven fibrous web to a thermoplastic film which comprises
    providing a nonwoven fibrous web,
    incrementally stretching said fibrous web along lines substantially uniformly across the web and throughout its depth to provide a multitude of fiber ends extending outwardly from both web surfaces,
    introducing said incrementally stretched web into a nip of rollers for extrusion lamination with a thermoplastic film,
    extruding into said nip a thermoplastic extrudate at a temperature above its softening point to form a film,
    controlling the compressive force between said fibrous web and extrudate at the nip to bond one surface of the web with said fiber ends extending into said film without penetrating through the film while maintaining said extending fiber ends on the other surface of the fibrous web to provide a soft fibrous texture to the laminate.

11. The method of claim 10 wherein said fibrous web comprises polyolefin fibers.

12. The method of claim 11 wherein said thermoplastic film is a polyolefin film.

13. The laminate of claim 10 wherein said fibers are selected from the group consisting of polypropylene, polyethylene, polyesters, cellulose, rayon, nylon and blends two or more of such fibers.

14. The method of claim 10 wherein the thermoplastic film is selected from the group consisting of polyethylene, polypropylene and copolymers thereof.

15. The method of claim 10 wherein the fibrous web has a weight from about 5 to 70 grams/yd$^2$ and the thermoplastic film has a film thickness of about 0.25 to about 8 mils and the inline stretching and extrusion laminating are conducted at about 500 to about 1000 fpm.

16. The laminate of claim 15 wherein said web is formed from staple or spun-bonded fibers.

* * * * *

UNITED STATES PATENT AND TRADEMARK OFFICE
CERTIFICATE OF CORRECTION

PATENT NO. : 5,382,461
DATED : January 17, 1995
INVENTOR(S) : Pai-Chuan Wu

It is certified that error appears in the above-indentified patent and that said Letters Patent is hereby corrected as shown below:

| | | | | | |
|---|---|---|---|---|---|
| Col. 5 | Line 2 | "0,031"" | should be | --0.031"-- |
| Col. 5 | Line 6 | "0,019"" | should be | --0.019"-- |
| Col. 5 | Line 9 | "0,100"" | should be | --0.100"-- |
| Col. 5 | Line 17 | "0,100"" | should be | --0.100"-- |
| Col. 5 | Line 20 | "0,010"" | should be | --0.010"-- |
| Col. 5 | Line 21 | "0,090"" | should be | --0.090"-- |
| Col. 5 | Line 39 | "0,090"" | should be | --0.090"-- |

UNITED STATES PATENT AND TRADEMARK OFFICE
CERTIFICATE OF CORRECTION

PATENT NO. : 5,382,461
DATED : January 17, 1995
INVENTOR(S) : Pai-Chuan Wu

It is certified that error appears in the above-indentified patent and that said Letters Patent is hereby corrected as shown below:

Col. 5 Line 39  "0,120'""  should be  --0.120"--

Col. 6 Line 28  "0,090""  should be  --0.090"--

Col. 8 Line 3  "weight of grams/yd$^2$"  should be  --weight of 14 grams/yd$^2$--

Col. 9 Line 64  "film for bonding"  should be  --film bonding--

Col. 10 Line 24  "web formed"  should be  --web is formed--

Signed and Sealed this

Twenty-seventh Day of June, 1995

Attest:

BRUCE LEHMAN

*Attesting Officer*    *Commissioner of Patents and Trademarks*

REEXAMINATION CERTIFICATE (3661th)

United States Patent [19]
Wu

[11] B1 5,382,461
[45] Certificate Issued Nov. 3, 1998

[54] EXTRUSION LAMINATE OF INCREMENTALLY STRETCHED NONWOVEN FIBROUS WEB AND THERMOPLASTIC FILM AND METHOD

[75] Inventor: Pai-Chuan Wu, Cincinnati, Ohio

[73] Assignee: Clopay Plastic Products Company, Inc., Cincinnati, Ohio

Reexamination Request:
No. 90/004,275, Jun. 13, 1996

Reexamination Certificate for:
| | |
|---|---|
| Patent No.: | 5,382,461 |
| Issued: | Jan. 17, 1995 |
| Appl. No.: | 32,355 |
| Filed: | Mar. 12, 1993 |

[51] Int. Cl.$^6$ .............. B32B 3/26; B32B 5/02; B32B 31/30
[52] U.S. Cl. .............. 428/86; 156/160; 156/196; 156/229; 156/244.27; 428/334; 428/335; 428/336; 428/340; 442/62
[58] Field of Search ............... 442/62; 428/86, 428/354, 336, 340; 156/160, 196, 229, 244.27

[56] References Cited

U.S. PATENT DOCUMENTS

| | | | |
|---|---|---|---|
| 2,714,571 | 3/1955 | Irion et al. | 156/153 |
| 2,896,626 | 7/1959 | Voigtman | |
| 3,058,868 | 10/1962 | Schroeder, III | 428/86 |
| 3,591,444 | 7/1971 | Hoppl | 156/306 |
| 4,223,059 | 9/1980 | Schwarz | 428/198 |
| 4,223,063 | 9/1980 | Sabee | 428/224 |
| 4,242,406 | 12/1980 | Bouhnini | 428/236 |
| 4,368,565 | 1/1983 | Schwarz | 26/99 |
| 4,379,197 | 4/1983 | Cipriani et al. | 428/220 |
| 4,517,714 | 5/1985 | Sneed | 28/103 |
| 4,522,203 | 6/1985 | Mays | 128/132 |
| 4,614,679 | 9/1986 | Farrington, Jr. | 428/138 |
| 4,692,368 | 9/1987 | Taylor et al. | 428/137 |
| 4,725,473 | 2/1988 | Van Gompel et al. | 428/156 |
| 4,753,837 | 6/1988 | Habusa | 428/86 |
| 4,753,840 | 6/1988 | Van Gompel | 428/171 |
| 4,911,970 | 3/1990 | Rodenbechs | 428/86 |
| 5,035,941 | 7/1991 | Blackburn | 428/286 |

*Primary Examiner*—Christopher W. Raimund

[57] ABSTRACT

Extrusion laminates of incrementally stretched nonwoven fibrous webs and thermoplastic films are made. A web of spun bonded fibers is incrementally stretched to provide fiber ends extending outwardly from both web surfaces for bonding with the extruded thermoplastic film and to provide a soft fibrous texture to the laminate.

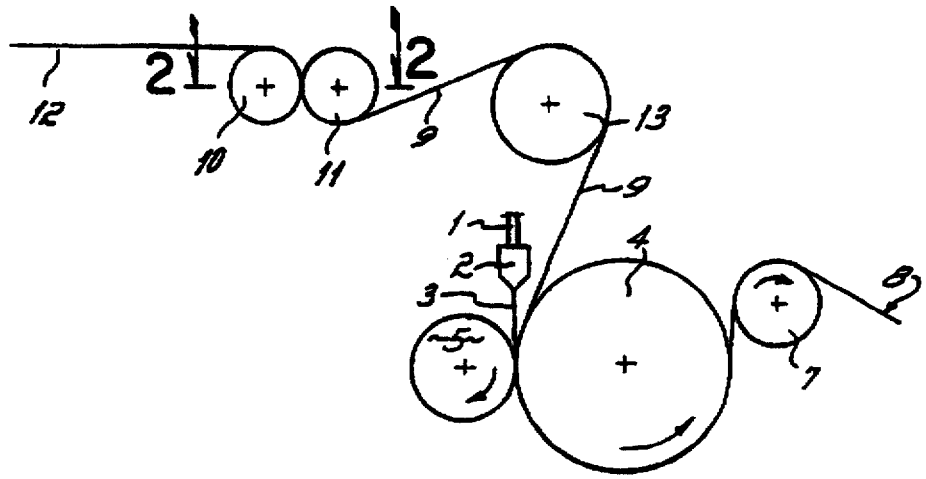

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10–12, 14 and 15 is confirmed.

Claims 1–9, 13 and 16 are cancelled.

New claims 17 and 18 are added and determined to be patentable.

*17. The method of claim 10 wherein both said web and film are made from biodegradable polymer.*

*18. The method of claim 17 wherein the biodegradable polymer is selected from the group consisting of polyvinyl alcohol, polycaprolactone, starch polymers and blends thereof.*

* * * * *